US008282481B2

(12) United States Patent
Yun

(10) Patent No.: US 8,282,481 B2
(45) Date of Patent: Oct. 9, 2012

(54) SYSTEM AND METHOD FOR CYBER TRAINING OF MARTIAL ART ON NETWORK

(76) Inventor: Sang Bum Yun, Vancouver, WA (US)

( * ) Notice: Subject to any disclaimer, the term of this patent is extended or adjusted under 35 U.S.C. 154(b) by 0 days.

(21) Appl. No.: 13/179,556

(22) Filed: Jul. 10, 2011

(65) Prior Publication Data

US 2012/0052946 A1 Mar. 1, 2012

(30) Foreign Application Priority Data

Aug. 24, 2010 (KR) ........................ 10-2010-0082129

(51) Int. Cl.
*A63F 13/00* (2006.01)

(52) U.S. Cl. ........................................................ 463/32

(58) Field of Classification Search .................. 463/4, 7, 463/8, 23, 37, 42, 32
See application file for complete search history.

(56) References Cited

U.S. PATENT DOCUMENTS

2005/0070355 A1 3/2005 Shimizu

FOREIGN PATENT DOCUMENTS

KR 2005-30156 A 3/2005
KR 2005-118385 A 12/2005

OTHER PUBLICATIONS

Korean Patent Office Action issued on Oct. 29, 2010.

*Primary Examiner* — Peter DungBa Vo
*Assistant Examiner* — Jeffrey Wong
(74) *Attorney, Agent, or Firm* — Justin H. Kim; Maxon IP LLC

(57) ABSTRACT

Disclosed herein is a system and method for virtual martial arts training using a network. The system includes a user terminal, a network server, a data management unit, and a network administrator terminal. The user terminal exchanges user information with a network server, selects a training discipline and grade or an examination discipline and grade, and transmits a difference value and a correction value together with a user motion image. The network server includes user information management means, training information management means, examination information management means, examination and determination management means, image information management means, and communication means. The data management means includes a user information database (DB), a training information DB, an examination information DB, an examination and determination DB, and an image information DB, and inputs and outputs the information. The network administrator terminal accesses the network server to exchange network administrator information, and manages the system.

21 Claims, 13 Drawing Sheets

210
210
710
810
620
310
210
210
210
630

SYSTEM AND METHOD FOR CYBER TRAINING OF MARTIAL ART ON NETWORK

CLAIM FOR PRIORITY

This application claims priority to Korean Patent Application No. 10-2010-0082129 filed on Aug. 24, 2010, the entirety of which is incorporated herein by reference.

BACKGROUND

1. Technical Field

Embodiments of the present invention relate in general to a system and method for virtual martial arts training using a network, and more specifically, to a system and method for virtual martial arts training using a network in which each of a plurality of terminals senses each motion of a user, compares the motion with a reference motion, displays the results as images, and exchanges the images with a server via the network, so that a trainee can effectively train in martial arts alone by having his or her motions corrected and can undertake an examination procedure without temporal and spatial constraints.

2. Related Art

In the present invention, the term "martial arts" denotes various martial arts, such as taekwondo, kung fu, karate, qigong and kendo, various combative sports, such as boxing, wrestling and judo, and the like.

To train in a martial art, a trainee should normally attend a gym or academy. However, it is difficult for the busy people of today to train in martial arts due to temporal and spatial constraints.

As a conventional art for solving these problems, a method of receiving educational video data to train in martial arts or sports practiced daily and informing a user of the degree of training progress by remote online examination has been disclosed in Korean Patent Publication No. 2002-0041688 entitled "Method for Educating and Examining Accomplishment Levels of Martial Arts and Living Athletics Online."

However, the conventional art provides only a one-way explanation-oriented educational function of simply playing an educational video. Since information is not exchanged in real time between a trainee and an apparatus, the trainee's posture cannot be corrected, and the trainee cannot effectively undertake an examination procedure alone.

SUMMARY

Accordingly, embodiments of the present invention are provided to substantially overcome one or more of the problems resulting from the constraints and disadvantages of the related art.

Embodiments of the present invention provide a system and method for virtual martial arts training using a network in which each of a plurality of terminals senses each motion of a user, compares the motion with a reference motion, displays the results as images, and exchanges the images with a server via the network to enable real-time information exchange and interaction between a trainee and the server in a house, a gym, or an academy without temporal and spatial constraints, so that the trainee can effectively train in martial arts alone by having his or her motions corrected and can undertake an examination procedure.

In some embodiments, a system for virtual martial arts training using a network includes: a user terminal configured to access the Internet to exchange user information with a network server, select a training discipline and grade or an examination discipline and grade to receive training progress information according to the selected training discipline and grade or examination progress information according to the selected examination discipline and grade and to execute a training program or an examination program, and transmit a difference value and a correction value together with a user motion image to perform training and examination functions; a network server configured to comprise user information management means configured to receive the user information from the user terminal, and compare the user information with previously stored information to allow a user to log in, training information management means configured to transmit the training progress information according to the training discipline and grade transmitted from the user terminal, receive the training results, perform updates using the training results, and manage the training results, examination information management means configured to transmit the examination progress information according to the examination discipline and grade transmitted from the user terminal, receive the examination results, perform updates using the examination results, and manage the examination results, examination and determination management means configured to determine the pass or failure of an examination based on the difference value transmitted from the user terminal, more specifically, determine pass or failure and a grade by relative evaluation within the corresponding category according to area-, age-, and sex-specific rankings, image information management means configured to receive the user motion image transmitted from the user terminal, perform updates using the user motion image, and manage the user motion image, and communication means configured to exchange information with the user terminal; data management means configured to comprise a user information database (DB) for storing the user information, a training information DB for storing the training progress information, an examination information DB for storing the examination progress information, an examination and determination DB for storing examination and determination information, and an image information DB for storing the user motion image, and configured to input and output the respective pieces of information in response to a request from the network server; and a network administrator terminal configured to access the network server to exchange network administrator information and manage the system.

The training information management means and the examination information management means may obtain the area-, age-, and sex-specific rankings based on the difference value and the correction value transmitted from the user terminal, and update the respective pieces of training and examination progress information, and the examination and determination management means may determine the pass or failure based on the difference value, more specifically, determine pass or failure and a grade by relative evaluation within the corresponding category according to the area-, age-, and sex-specific rankings.

The area in which the user terminal is located may be checked based on an Internet protocol (IP) address of the user allocated by an Internet service provider (ISP).

The user terminal may include: an input unit configured to receive the user information to allow the user to log in, and select a grade-specific training process or examination process; a motion recognition unit configured to detect a movement speed, a distance, a position, and an angle of the user to recognize the user motion; a position detector configured to detect a position of the user's feet on a plane; a data storage unit configured to previously store a movement speed, a distance, a position, and an angle of the reference motion, and store the user information, the determination result, and a grade-specific training process program and examination process program corresponding to the selection of the input unit; a controller configured to execute the training process program or the examination process program stored in the data storage unit according to the selection of the input unit, determine a user motion in three-dimensional (3D) space with reference to the user motion recognized by the motion recognition unit and the position of the user's feet detected by the position detector, compare the user motion with the reference motion previously stored in the data storage unit to calculate the difference value, generate the correction value for instructing the user to perform a correct motion based on the difference value, generate the user motion image using a previously stored virtual character, and generate a correction image and an explanatory phrase for the correction value; a main image display unit configured to merge the correction image and the explanatory phrase with the user motion image generated by the controller and display the merged image; and a communication unit configured to exchange the user information, the training progress information, the examination progress information, and the user motion image with the communication means of the network server to transfer the pieces of information and the user motion image to the controller.

The input unit may include: a login key configured to receive the user information and allow the user to log in; a training process selection key configured to select one training process to be performed from among a plurality of previously stored grade-specific training processes; and an examination process selection key configured to select one examination process to be performed from among a plurality of previously stored grade-specific examination processes.

The motion recognition unit may include a plurality of motion capture cameras configured to detect movement of a plurality of markers attached to the user's body using infrared photography to recognize the user motion.

The motion recognition unit may include one or a combination of a geomagnetic sensor configured to sense a direction of terrestrial magnetism, an acceleration sensor configured to sense acceleration by accelerating a piezoelectric material, and a gyro sensor configured to sense an angular acceleration based on a vertical force of a rotating angle. Here, the one or the combination of the sensors may be attached to the user's body or clothing.

The position detector may include a resistive touchpad configured to have a predetermined area and measure the position of coordinates pressed by the user's feet and formed of two panels stacked to generate resistance at a pressed portion.

The controller may include: a program execution module configured to execute the training process program or the examination process program stored in the data storage unit according to the selection of the training process selection key or the examination process selection key; a motion determination module configured to determine the user motion in 3D space with reference to the user motion recognized by the motion recognition unit and the position of the user's feet detected by the position detector; a comparison and determination module configured to calculate the difference value by comparing data of the user motion determined by the motion determination module with data of the reference motion previously stored in the data storage unit, and generate the correction value for instructing the user to perform the correct motion based on the difference value; and an image generation module configured to generate the user motion image using the previously stored virtual character, and generate the correction image using the difference value and the correction value of the comparison and determination module, and generate the explanatory phrase.

The image generation module may further generate an effect image and a background image according to the user motion image of the main image display unit, and include a background image display unit configured to display the effect image and the background image on a flat panel display (FPD) module.

The controller may further include: a sound generation module configured to generate sound effects and background music according to the main image, the effect image, and the background image generated by the image generation module; and a sound output unit configured to output the sound effects and the background music generated by the sound generation module through a speaker.

The main image display unit may include: 3D glasses worn by the user; and a 3D image display module configured to display a 3D image, to be viewed in three dimensions through the 3D glasses, on a screen.

The main image display unit may include a hologram image display module configured to display successive 3D images by generating interference fringe patterns using the principle of holography.

The main image display unit may include a head mounted display (HMD) module put on the user's head, and configured to display a realized image on an HMD screen.

The system may further include a user image capturing unit configured to capture an image of the user. Here, the controller may generate the user motion image using the image captured by the user image capturing unit.

In other embodiments, a method of virtually training in martial arts using a network includes: receiving, at user information management means of a network server accessing the Internet, user information transmitted from a user terminal, and comparing the user information with information previously stored in a user information DB to allow a user to log in; selecting and transmitting, at the user terminal, a training discipline and grade, reading, at training information management means, training progress information according to the training discipline and grade from a training information DB and transmitting the training progress information to the user terminal, and executing, at the user terminal, a training program according to the training progress information; selecting and transmitting, at the user terminal, an examination discipline and grade, reading, at examination information management means, examination progress information according to the examination discipline and grade from an examination information DB and transmitting the examination progress information to the user terminal, and executing, at the user terminal, an examination program according to the examination progress information; detecting at a motion recognition unit of the user terminal, a movement speed, a distance, a position, and an angle of the user to recognize a user motion, detecting, at a position detector, a position of the user's feet on a plane, and determining, at a controller, a user motion in 3D space with reference to the user motion recognized by the motion recognition unit and the position of the user's feet detected by the position detector; comparing, at the controller of the user terminal, the user motion with a reference motion previously stored in a data storage unit to generate a difference value and a correction value, generating a user motion image using a previously stored virtual character, generating a correction image and an explanatory phrase for the correction value, merging the correction image and the explanatory phrase with the user motion image to display the merged image on a main image display unit, and outputting sound; transmitting, at the user terminal, the correction value and the user motion image, receiving and storing, at image information management means, the user motion image in an image information DB, obtaining, at the training information management means, area-, age-, and sex-specific training rankings according to the correction value, updating the training information DB with the training progress information, and transmitting the training progress information to the user terminal, and receiving and displaying, at the user terminal, the training results on a screen; and transmitting, at the user terminal, the difference value and the user motion image, receiving and storing, at the image information management means, the user motion image in the image information DB, obtaining, at the examination information management means, area-, age-, and sex-specific examination rankings based on the difference value, determining, at examination and determination management means, the pass or failure based on the difference value, more specifically, determining pass or failure and a grade by relative evaluation within the corresponding category according to the area-, age-, and sex-specific examination rankings, updating the examination information DB with the examination progress information, and transmitting the examination progress information to the user terminal, and receiving and displaying, at the user terminal, the examination results on the screen.

The area in which the user terminal is located may be checked based on the IP of the user allocated by an ISP.

The recognizing the user motion may include attaching a plurality of markers to the user's body and detecting movement of the markers using infrared photography and using a plurality of motion capture cameras to recognize the user motion.

The recognizing the user motion may include sensing a direction of terrestrial magnetism using a geomagnetic sensor attached to the user's body or clothing, accelerating a piezoelectric material and sensing an acceleration using an acceleration sensor, or sensing an angular acceleration based on a vertical force of a rotating angle using a gyro sensor, to recognize the user motion.

The displaying the merged image may include further generating, at the controller, an effect image and a background image, and displaying, at a background image display unit, the effect image and the background image on the screen.

The outputting the sound may include generating, at the controller, a voice explanation corresponding to the correction value and sound effects and background music according to the voice explanation, and outputting, at a sound output unit, the voice explanation, the sound effects, and the background music through a speaker.

The displaying the merged image may include displaying a 3D image to be viewed through 3D glasses worn by the user on the screen using a 3D image display module, displaying successive 3D images by generating interference fringe patterns based on the principle of holography using a hologram image display module, or displaying a realized image on an HMD screen of an HMD module put on the user's head.

BRIEF DESCRIPTION OF DRAWINGS

Embodiments of the present invention will become more apparent by describing in detail embodiments of the present invention with reference to the accompanying drawings, in which.

DESCRIPTION OF EMBODIMENTS OF THE PRESENT INVENTION

Figure 1:
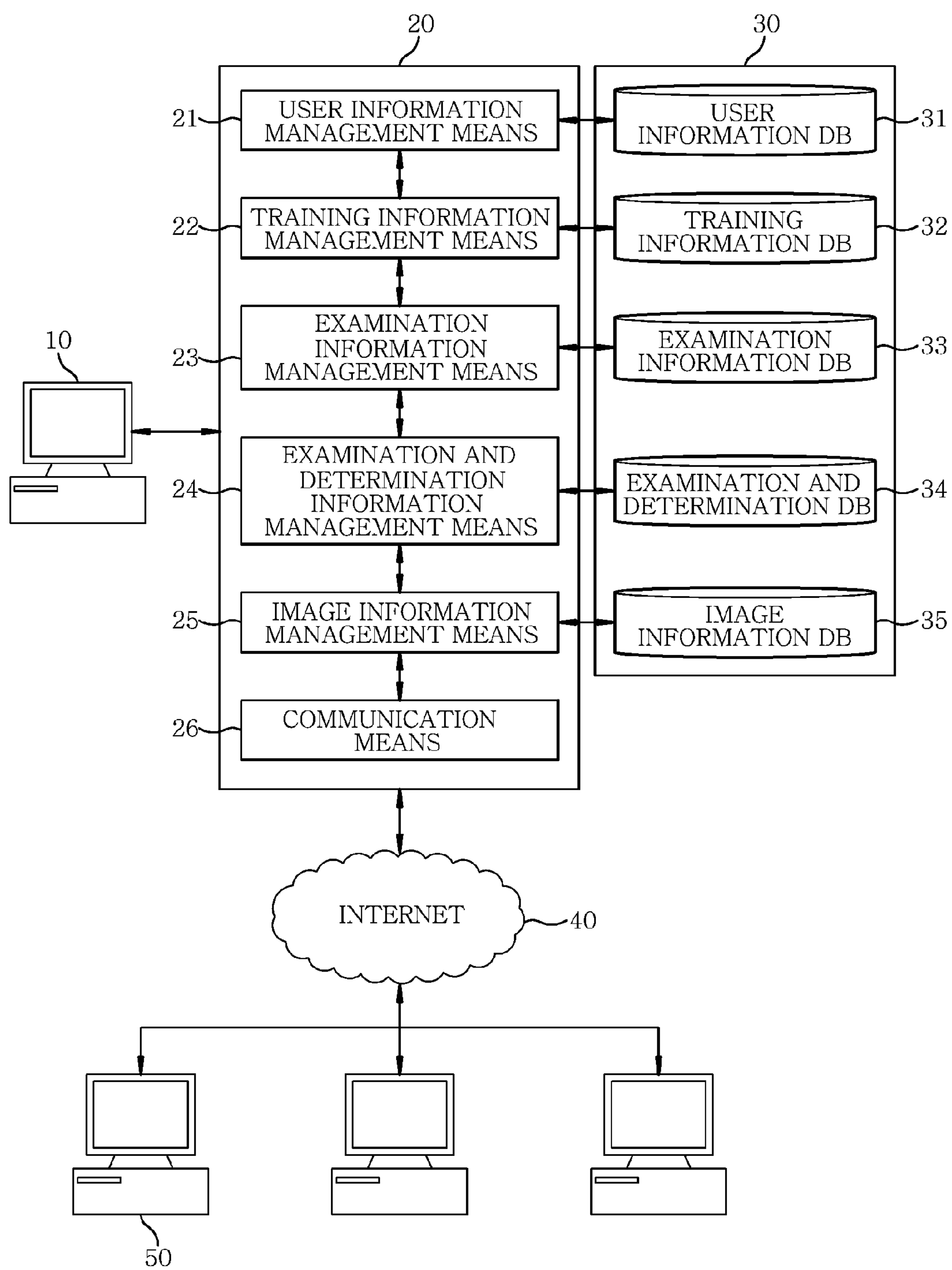
FIG. 1 is a block diagram of a system for virtual martial arts training using a network according to embodiments of the present invention.

Embodiments of the present invention are disclosed herein. However, specific structural and functional details disclosed herein are merely representative for purposes of describing embodiments of the present invention, but embodiments of the present invention may be embodied in many alternative forms and should not be construed as being limited to embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention should include all modifications, equivalents, and alternatives falling within the spirit and scope of the invention. Like numbers refer to like elements throughout the description of the figures.

FIG. 1 is a block diagram of a system for virtual martial arts training using a network according to embodiments of the present invention.

As shown in the drawing, the system includes a network administrator terminal 10, a network server 20, user information management means 21, training information management means 22, examination information management means 23, examination and determination management means 24, image information management means 25, communication means 26, data management means 30, a user information database (DB) 31, a training information DB 32, an examination information DB 33, an examination and determination DB 34, an image information DB 35, the Internet 40, and a user terminal 50.

The user terminal 50 may be installed in a house, a gym, or an academy and used without temporal and spatial constraints.

The user terminal 50 accesses the Internet 40 to exchange user information with the network server 20, selects a training discipline and grade to receive training progress information according to the selected training discipline and grade, or an examination discipline and grade to receive examination progress information according to the selected examination discipline and grade, executes a training program or an examination program, and performs training and examination functions while transmitting a difference value and a correction value together with a user motion image. A detailed constitution of the user terminal will be described later with reference to appended FIGS. 2 to 4.

The network server 20 includes the user information management means 21, the training information management means 22, the examination information management means 23, the examination and determination management means 24, the image information management means 25, and the communication means 26.

The user information management means 21 receives the user information from the user terminal 50, compares the received user information with previously stored information, and allows a user to log in.

The training information management means 22 transmits the training progress information according to the training discipline and grade transmitted from the user terminal 50, and receives the training results to perform updates and manage the training result.

The training progress information may include information such as the number of times of training, a date, an access time, and a cumulative time, for respective disciplines and grades.

The examination information management means 23 transmits the examination progress information according to the examination discipline and grade transmitted from the user terminal 50, and receives the examination results to perform updates and manage the examination results.

The examination and determination management means 24 determines the pass or failure of the examination based on the difference value transmitted from the user terminal 50. More specifically, the examination and determination management means 24 determines a pass or a failure and a grade using relative evaluation within the corresponding category according to area-, age-, and sex-specific rankings.

The image information management means 25 receives the user motion image from the user terminal 50 to perform updates and manage the received user motion image.

The communication means 26 exchanges information with the user terminal 50.

The data management means 30 inputs and outputs the respective pieces of information in response to a request from the network server 20. To this end, the data management means 30 includes the user information DB 31 for storing the user information, the training information DB 32 for storing the training progress information, the examination information DB 33 for storing the examination progress information, the examination and determination DB 34 for storing examination and determination information, and the image information DB 35 for storing the user motion image.

The network administrator terminal 10 accesses the network server 20 to exchange network administrator information.

The training information management means 22 and the examination information management means 23 obtain the area-, age-, and sex-specific rankings based on the difference value and the correction value, and update the respective pieces of training and examination progress information.

The area in which the user terminal 50 is located may be checked based on an Internet protocol (IP) address of the user allocated by an Internet service provider (ISP).

Figure 2:
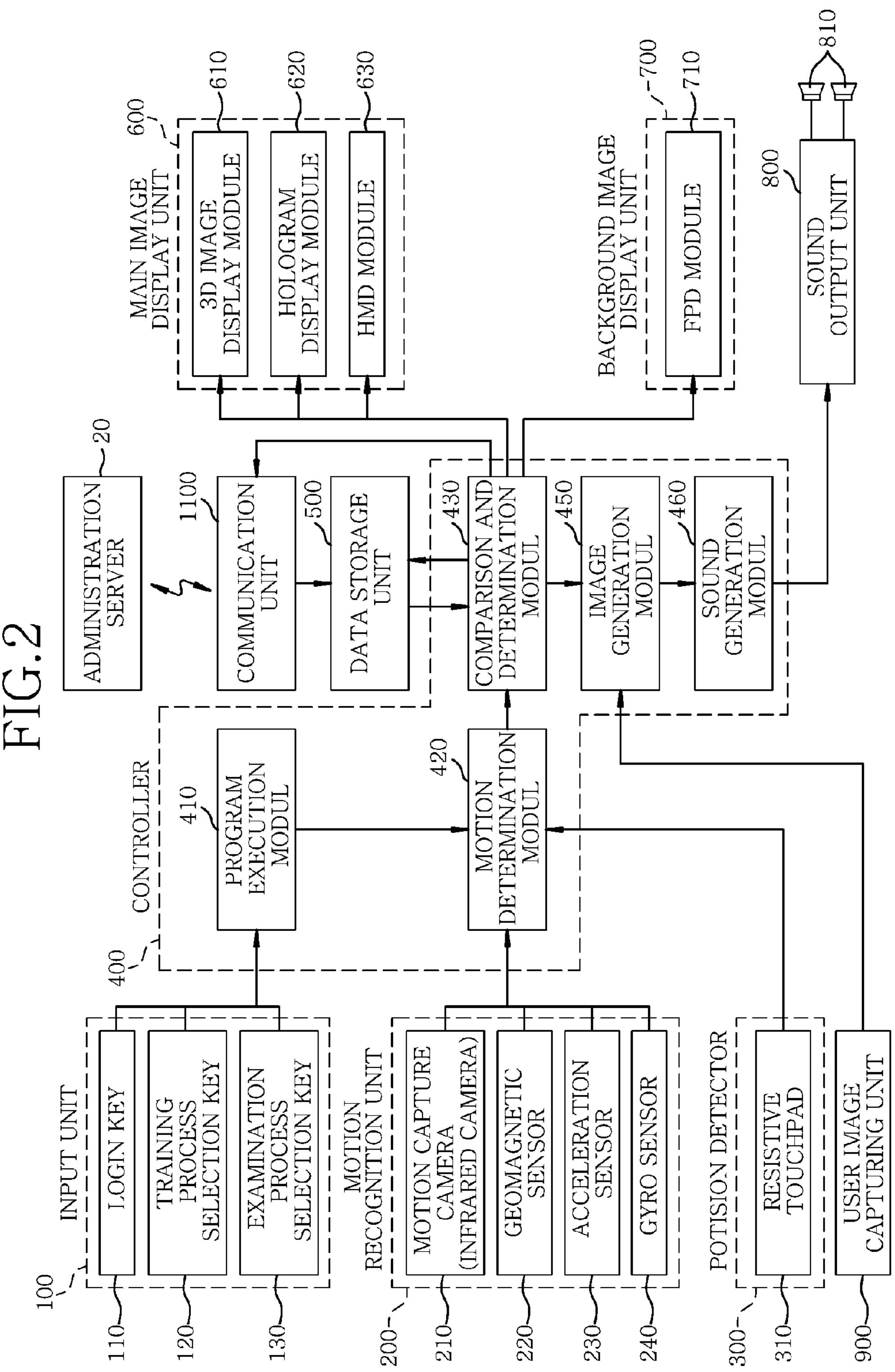
FIG. 2 is a block diagram of the user terminal of FIG. 1.
Figure 3:
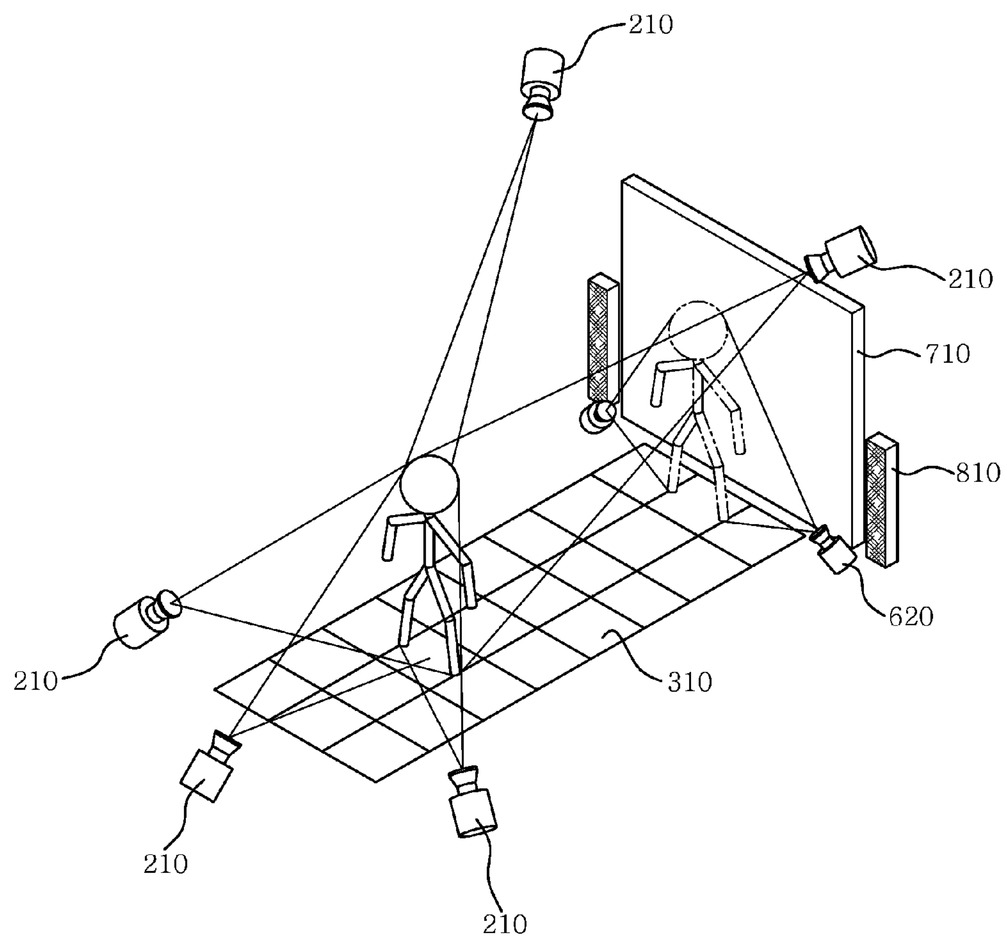
FIG. 3 is a perspective view illustrating a system for virtual martial arts training implemented using a hologram according to an embodiment of the present invention.
Figure 4:
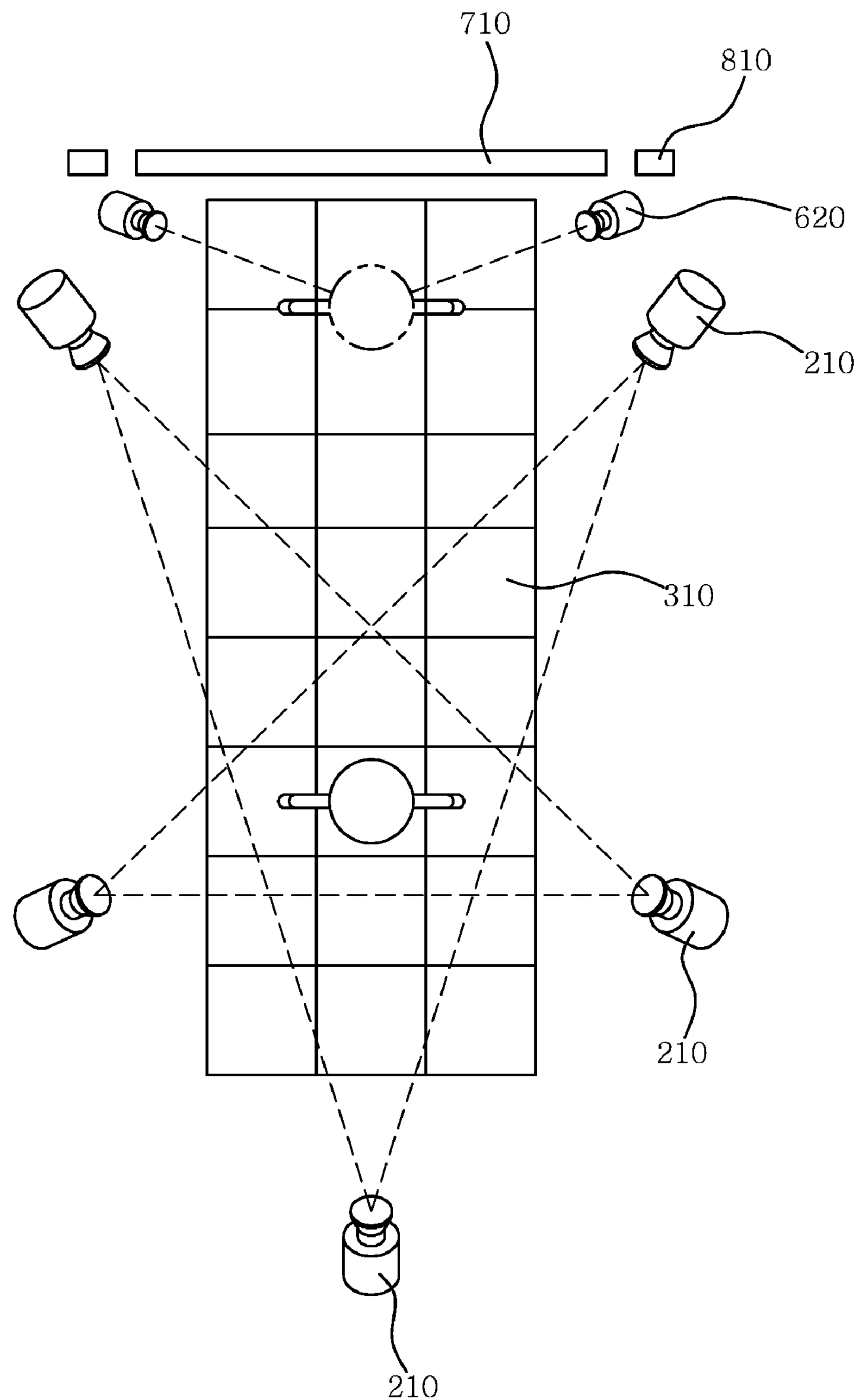
FIG. 4 is a plan view of FIG. 3.

FIG. 2 is a block diagram of the user terminal of FIG. 1. FIG. 3 is a perspective view illustrating a system for virtual martial arts training implemented using a hologram according to an embodiment of the present invention, and FIG. 4 is a plan view of FIG. 3.

As shown in the drawings, the user terminal 50 according to embodiments of the present invention includes an input unit 100, a login key 110, a training process selection key 120, an examination process selection key 130, a motion recognition unit 200, motion capture cameras 210, a geomagnetic sensor 220, an acceleration sensor 230, a gyro sensor 240, a position detector 300, a resistive touchpad 310, a controller 400, a program execution module 410, a motion determination module 420, a comparison and determination module 430, an image generation module 450, a sound generation module 460, a data storage unit 500, a main image display unit 600, a three-dimensional (3D) image display module 610, a hologram image display module 620, a head mounted display (HMD) module 630, a background image display unit 700, a flat panel display (FPD) module 710, a sound output unit 800, speakers 810, and a communication unit 1100.

The input unit 100 receives the user information to allow the user to log in, and selects a grade-specific training process or examination process.

To this end, the input unit 100 includes the login key 110, the training process selection key 120, and the examination process selection key 130.

The login key 110 identifies the user based on the user information, for example, a name, an address, a birth date and a resident registration number, input by the user, and allows the user to log in. The user may log in by inputting numbers, characters, etc. using the login key 110 or using a card or an electronic chip.

The training process selection key 120 selects one training process to be performed from among a plurality of the previously stored grade-specific training processes, and the examination process selection key 130 selects the corresponding grade-specific examination process.

The motion recognition unit 200 recognizes a user motion. To this end, the motion recognition unit 200 may include the plurality of motion capture cameras 210 as shown in FIG. 3.

The plurality of motion capture cameras 210 are disposed to take pictures of the user from various angles, and recognize a motion of the user by detecting motions of a plurality of markers attached to the user's body using infrared photography. Here, the markers may be attached to the user's head, torso, wrists, and ankles, and the user's body may be thought of as a set of articular models having a link structure.

As generally known, motion capture denotes an operation of digitally recording a motion of a human body using sensors attached to the body. This technology is used to cause a virtual character to perform the same motion using position values of sensors attached to several parts of an actual body. In other words, motion capture may refer to a process of storing a motion of an actual object as numerical data and transferring the motion data to a virtual object generated by a computer. In this specification, "motion capture" refers to an operation of inputting a motion of an actual object to a computer and storing the motion as numerical data in the computer. In brief, the process includes attaching a sensor capable of sensing a motion to an object and storing numerical data of a motion of the object at regular intervals. Images processed by computer graphics (CG) technology using motion capture show a soft curve, that is, a realistic motion, and thus have high quality. To this end, special markers (sensors) are attached to a person's joints. Then, position and rotational data of the markers is recognized by a special device in real time to generate a motion data set or a motion curve. In an infrared reflector scheme, six to eight cameras two-dimensionally detect markers at the joints of a motion actor and three-dimensionally track and capture a motion.

Alternatively, the motion recognition unit 200 may include one or a combination of the geomagnetic sensor 220, the acceleration sensor 230, and the gyro sensor 240 attached to the user's body.

The geomagnetic sensor 220 senses a direction of terrestrial magnetism. The geomagnetic sensor 220 senses the magnetic field of the earth to obtain direction information, such as north, south, east and west, like a compass.

The acceleration sensor 230 senses acceleration by accelerating a piezoelectric material. The acceleration sensor 230 makes use of a principle whereby an electric charge is generated when a general piezoelectric material accelerates.

The gyro sensor 240 senses an angular acceleration based on a vertical force of a rotating angle. A Coriolis force is generated in the vertical direction of a rotating angle, and the gyro sensor 240 senses the vertical force using the same principle as the acceleration sensor.

The position detector 300 may detect a position of the user and a shift of the user's weight, etc. by detecting a position and the pressure of the user's feet on a support surface. The resistive touchpad 310 disposed in the form of a footboard on a bottom surface may be employed by the position detector 300.

The resistive touchpad 310 has a predetermined area and is formed of two panels stacked to generate resistance at a pressed portion, thus measuring a position and pressure of the coordinates pressed by the user's feet.

The data storage unit 500 previously stores a movement speed, a distance, a position, and an angle of a reference motion, and stores a grade-specific training process program and examination process program corresponding to the selection of the input unit 100, the user information, and the determination result.

The data storage unit 500 may be various data storage means such as a hard disk drive (HDD) and random-access memory (RAM).

The controller 400 may execute the training process program or the examination process program stored in the data storage unit 500 according to the selection of the input unit 100, recognize the user motion using the motion recognition unit 200, determine an accurate motion of the user in 3D space according to the position of the user detected by the position detector 300, compare a movement speed, a distance, a position, and an angle of the determined user motion with those of the reference motion stored in the data storage unit 500 to calculate the difference value, generate the correction value for instructing the user to perform a correct motion based on the difference value so that the generated correction value can be stored in the data storage unit 500, generate the user motion image using a previously stored virtual character, and generate a correction image and an explanatory phrase for the correction value.

To this end, the controller 400 includes the program execution module 410, the motion determination module 420, the comparison and determination module 430, the image generation module 450, and the sound generation module 460.

The program execution module 410 executes the training process program or the examination process program stored in the data storage unit 500 according to the selection of the training process selection key 120 or the examination process selection key 130.

The motion determination module 420 recognizes the user motion using the motion recognition unit 200, and determines the accurate motion of the user in the 3D space according to the position of the user detected by the position detector 300.

The comparison and determination module 430 may compare the movement speed, the distance, the position, and the angle of the user motion determined by the motion determination module 420 with those of the reference motion stored in the data storage unit 500 to calculate the difference value, and generate the correction value for the user based on the difference value.

The comparison and determination module 430 generates the correction value for instructing the user to perform the correct motion according to the calculated difference value. More specifically, the correction value has a predetermined range. The number of times the user has trained may be counted, and the range of the correction value may be gradually reduced as the number of times of training increases, so that the accuracy of the correction value increases. Thus, the user can naturally develop and improve skills in the range within the ability of the user's body.

The image generation module 450 generates the user motion image using the previously stored virtual character, and generates the correction image and the explanatory phrase based on the difference value and the correction value calculated by the comparison and determination module 430. For example, the correction image may be a figure expressing the correction value in the form of a vector, and the explanatory phrase may be an equation or sentence in which the correction value is recorded.

The main image display unit 600 merges the correction image and the explanatory phrase with the user motion image generated by the controller 400 and displays the merged image.

The communication unit 1100 exchanges information with the communication means 26 of the network server 20.

Embodiments of the present invention may further include a user image capturing unit 900 which captures an image of the user. At this time, the controller 400 may generate the user motion image using the image actually captured by the user image capturing unit 900.

The sound generation module 460 generates a voice explanation corresponding to the user motion image and the correction image. Also, the sound generation module 460 may generate sound effects and background music according to the voice explanation.

One of the 3D image display module 610, the hologram image display module 620, and the HMD module 630 may be employed by the main image display unit 600.

Also, embodiments of the present invention may further include the background image display unit 700 displaying an effect image and a background image on the FPD module 710. The effect image and the background image are generated by the image generation module 450. Here, the effect image and the background image may be generated according to the user motion image displayed by the main image display unit 600.

For example, a blue star may be displayed as an effect image of a kick motion, and a red circle may be displayed as an effect image of a punch motion. Otherwise, while an image of fireworks is displayed as a background image, the respective effect images may be displayed to overlay the background image.

Figure 5:
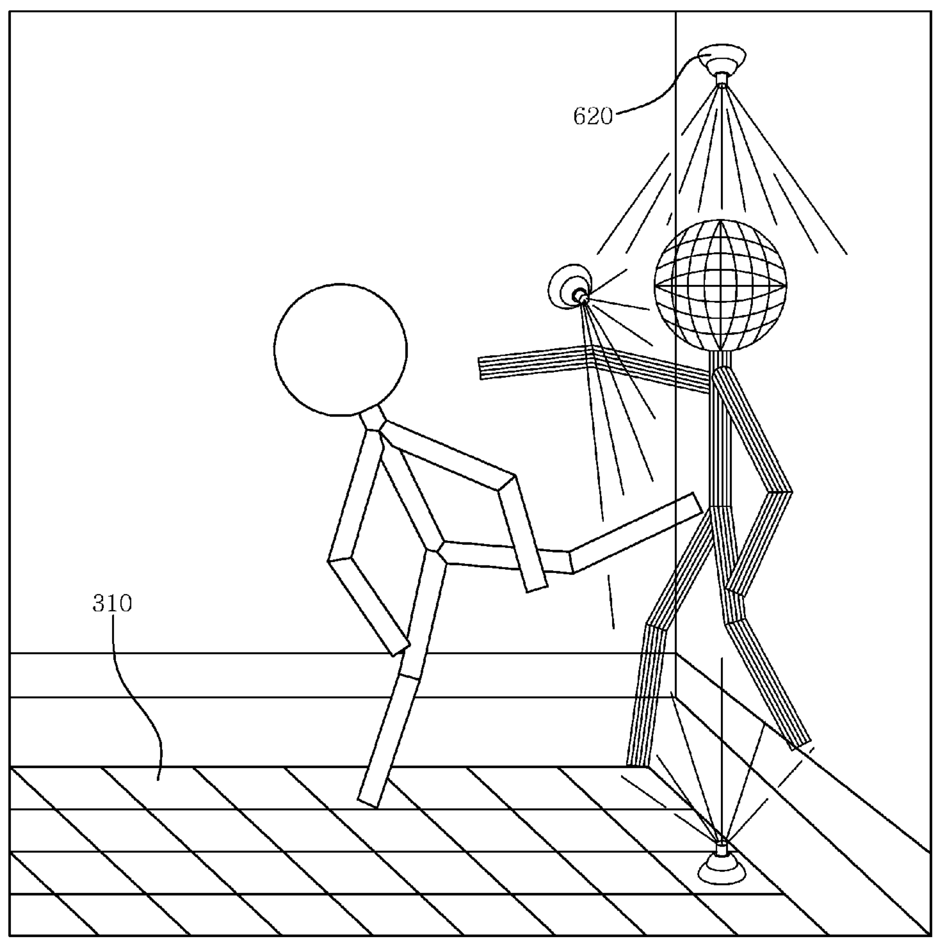
FIG. 5 is a conceptual diagram showing an example in which an image is implemented using a hologram display module.

As shown in FIG. 5, the hologram image display module 620 generates interference fringe patterns using the principle of holography, thereby displaying successive 3D images.

FIG. 5 is a conceptual diagram showing an example in which an image is implemented using a hologram display module. As is generally known, a hologram denotes a 3D image generated using the principle of holography and seen to be the same as an actual object, and also a medium in which interference fringe patterns showing a 3D figure are recorded. The principle of holography is that a laser directly emits one beam of output light to a screen and emits another beam of output light to an object that the user wants to see. Here, the beam directly illuminating the screen is referred to as a reference beam, and the other beam illuminating the object is referred to as an object beam. Since the object beam is light that has been reflected from respective surfaces of the object, phase differences (distances from the respective surfaces of the object to the screen) differ from each other depending on the surfaces of the object. Here, the reference beam that has not been modified interferes with the object beam, and the corresponding interference fringe patterns are shown on a screen. A film in which such interference fringe patterns are stored is referred to as a hologram. To display the stored image again, the beams used for recording should be projected to the screen again. Since only a wave having the same frequency as a wave for the recording is three-dimensionally displayed and waves not having the same wavelength and phase as the wave for the recording pass through the stored hologram with no effect, the beams used for replay should be exactly the same as the reference beam used for the recording.

Figure 6:
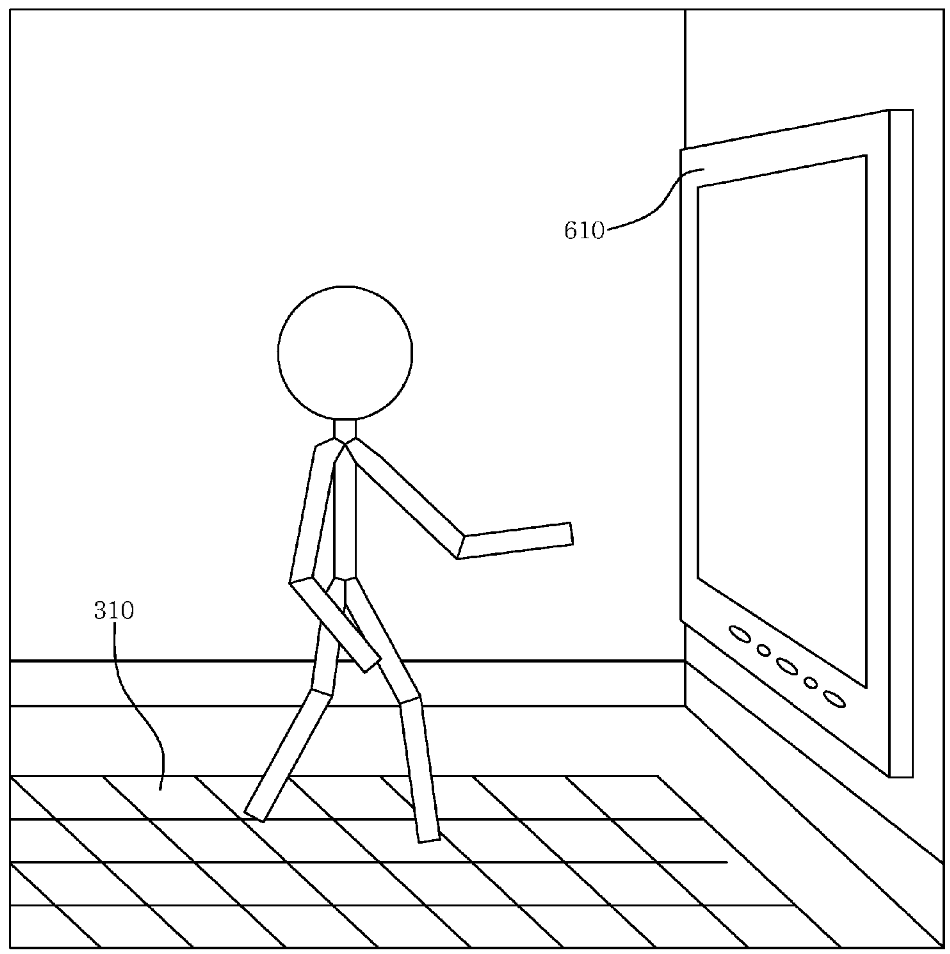
FIG. 6 is a conceptual diagram showing an example in which an image is implemented using a three-dimensional (3D) image display module.
Figure 7:
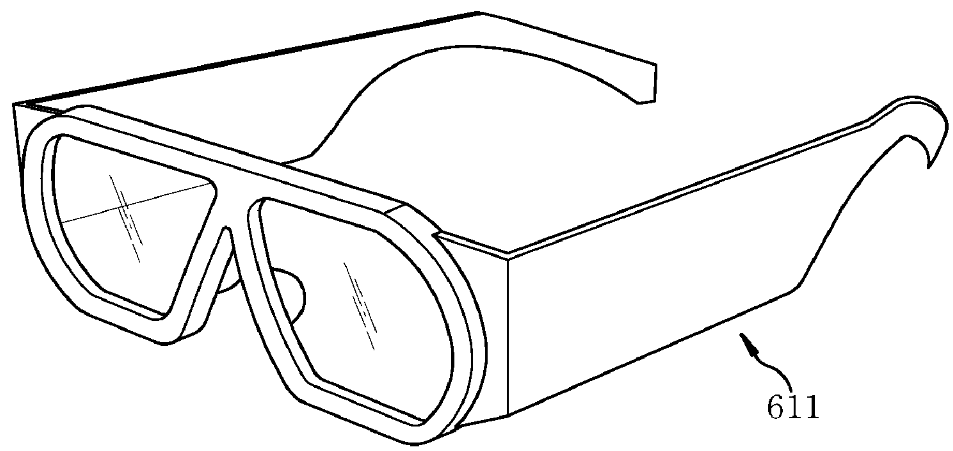
FIG. 7 illustrates the 3D glasses of FIG. 6 according to an embodiment of the present invention.

As shown in FIGS. 6 and 7, the 3D image display module 610 displays a 3D image, which is viewed in three dimensions through 3D glasses 611 worn by the user, on the screen. The main image display unit 600 may be a general FPD, such as a liquid crystal display (LCD), a light emitting diode (LED) display, or a plasma display panel (PDP), and used with the 3D glasses 611 worn by the user, so that a 3D image can be displayed on the screen.

FIG. 6 is a conceptual diagram showing an example in which an image is implemented using a 3D image display module, and FIG. 7 illustrates the 3D glasses of FIG. 6 according to an embodiment of the present invention. The 3D glasses 611 may be polarized glasses or liquid crystal shutter glasses. The polarized glasses allow images captured by two cameras to be separately viewed according to vertical and horizontal light information, thereby giving the impression of 3D.

The liquid crystal shutter glasses enable the user to see with both of his or her eyes in alternation by alternately closing the glasses, thereby giving the impression of 3D. The liquid crystal shutter glasses require electric power, and may be implemented to have a battery and to be rechargeable in embodiments of the present invention.

The 3D glasses 611 according to embodiments of the present invention have temples, but the temples may be formed as a band to improve the feeling of wearing them.

Figure 8:
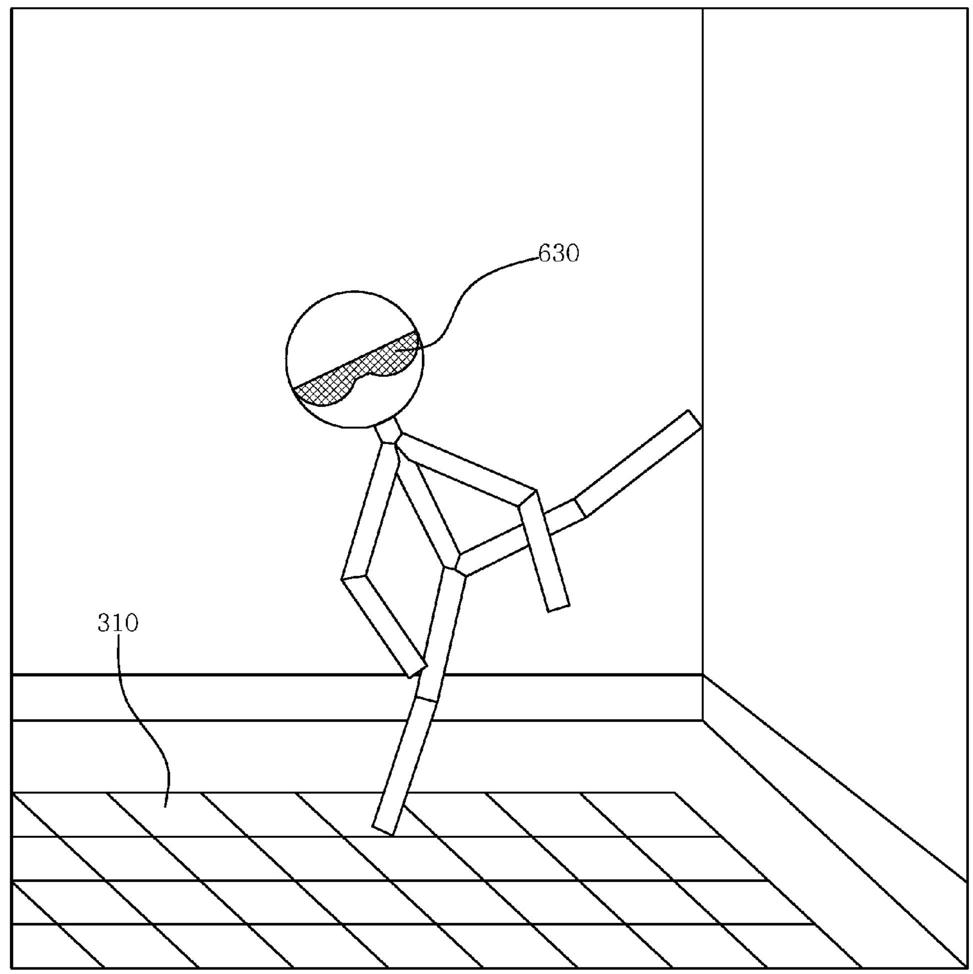
FIG. 8 is a conceptual diagram showing an example in which a head mounted display (HMD) module is used.
Figure 9:
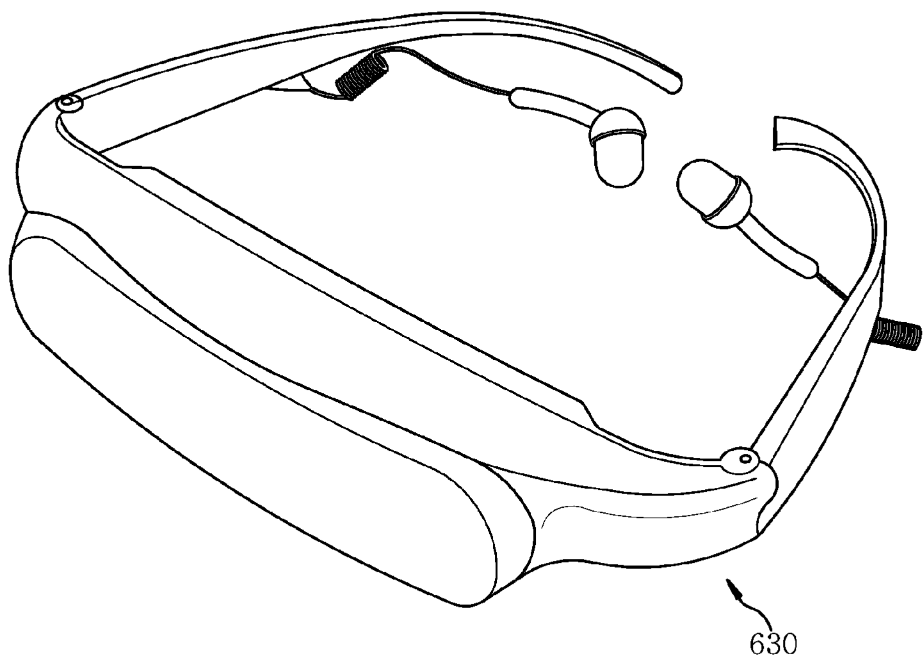
FIG. 9 illustrates the HMD module of FIG. 8 according to an embodiment of the present invention.

FIGS. 8 and 9 illustrate an example in which the HMD module 630 is employed by the main image display unit 600.

FIG. 8 is a conceptual diagram showing an example in which an HMD module is used, and FIG. 9 illustrates the HMD module of FIG. 8 according to an embodiment of the present invention. The HMD module 630 is a display device put on the user's head, and displays an image generated by the image generation module 450 on an HMD screen.

The HMD module 630 is classified as a mono or stereo type, and an open or closed type according to the shape. Like in a theater, the HMD module 630 limits the user's vision, thereby enabling immersion in an image. As a screen of the HMD module 630, a cathode ray tube (CRT) or LCD is used. In embodiments of the present invention, the LCD may be used to reduce power consumption and improve the feeling of wearing them.

Meanwhile, as illustrated in FIG. 2, the background image display unit 700 displays the effect image and the background image generated by the image generation module 450.

To this end, the general FPD module 710 may be employed by the background image display unit 700. The FPD module 710 refers to any FPD such as an LCD, an LED display, or a PDP.

The sound output unit 800 outputs the voice explanation generated to correspond to the correction image by the sound generation module 460 through the speakers 810. Together with the voice explanation, the sound output unit 800 may output sound effects and background music for the main image, the effect image, and the background image.

Although two speakers are shown in the drawings of the present invention, five or more speakers may be disposed to implement 3D sounds such as 5.1 CH sounds.

Figure 10:
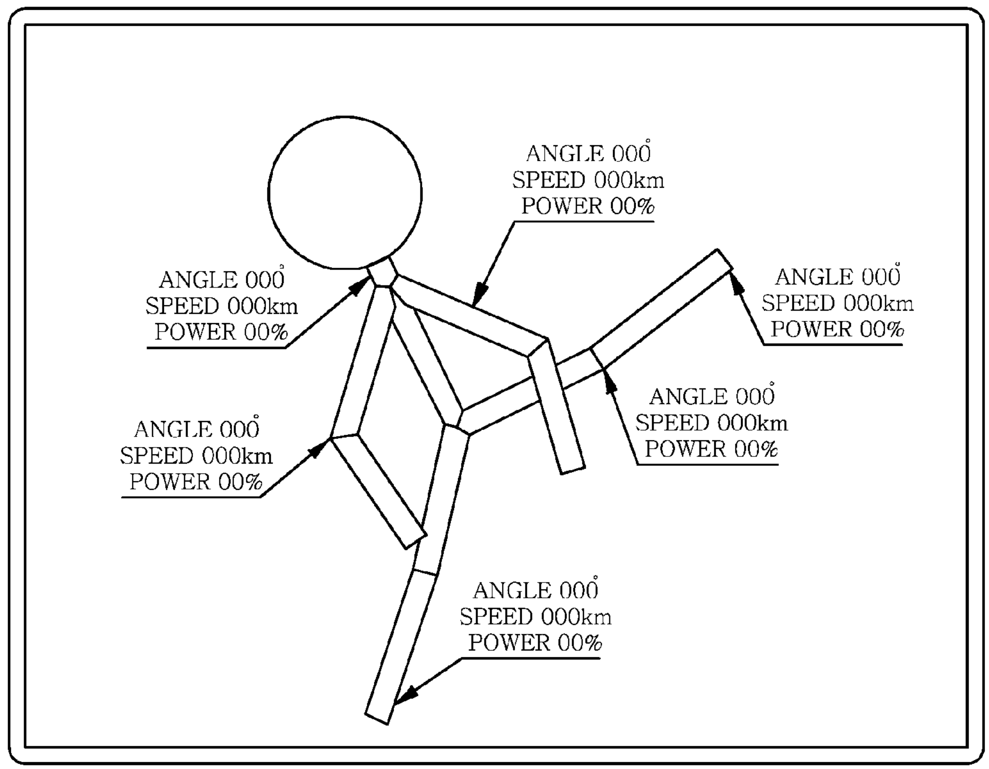
FIG. 10 shows a screen in which a user motion and correction values are displayed according to embodiments of the present invention.

FIG. 10 shows a screen in which a user motion and correction values are displayed according to embodiments of the present invention. The image generation module 450 according to embodiments of the present invention may generate the user motion image using the previously stored virtual character or a user image, generate the correction image using the difference value and the correction value calculated by the comparison and determination module 430, and output the correction image overlaid with the corresponding explanatory phrase. In other words, as shown in the drawing, data of an angle, a speed, a power, etc. is represented by characters at respective parts of the user's body shown in the main image, so that the user can check the accuracy of a motion by him or herself.

Figure 11A:
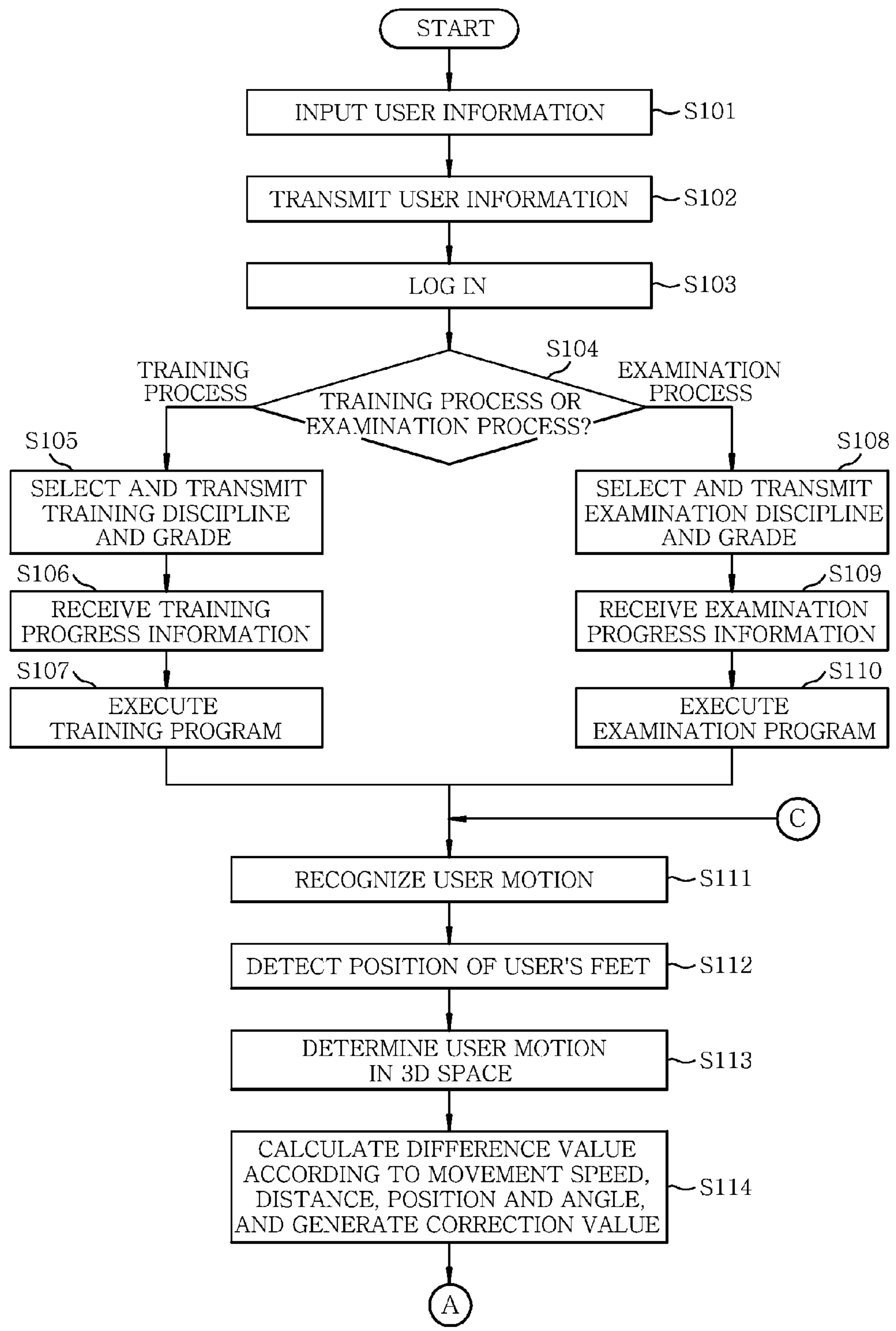
FIGS. 11A to 11C are flowcharts illustrating a method of virtually training in martial arts according to embodiments of the present invention.
Figure 11B:
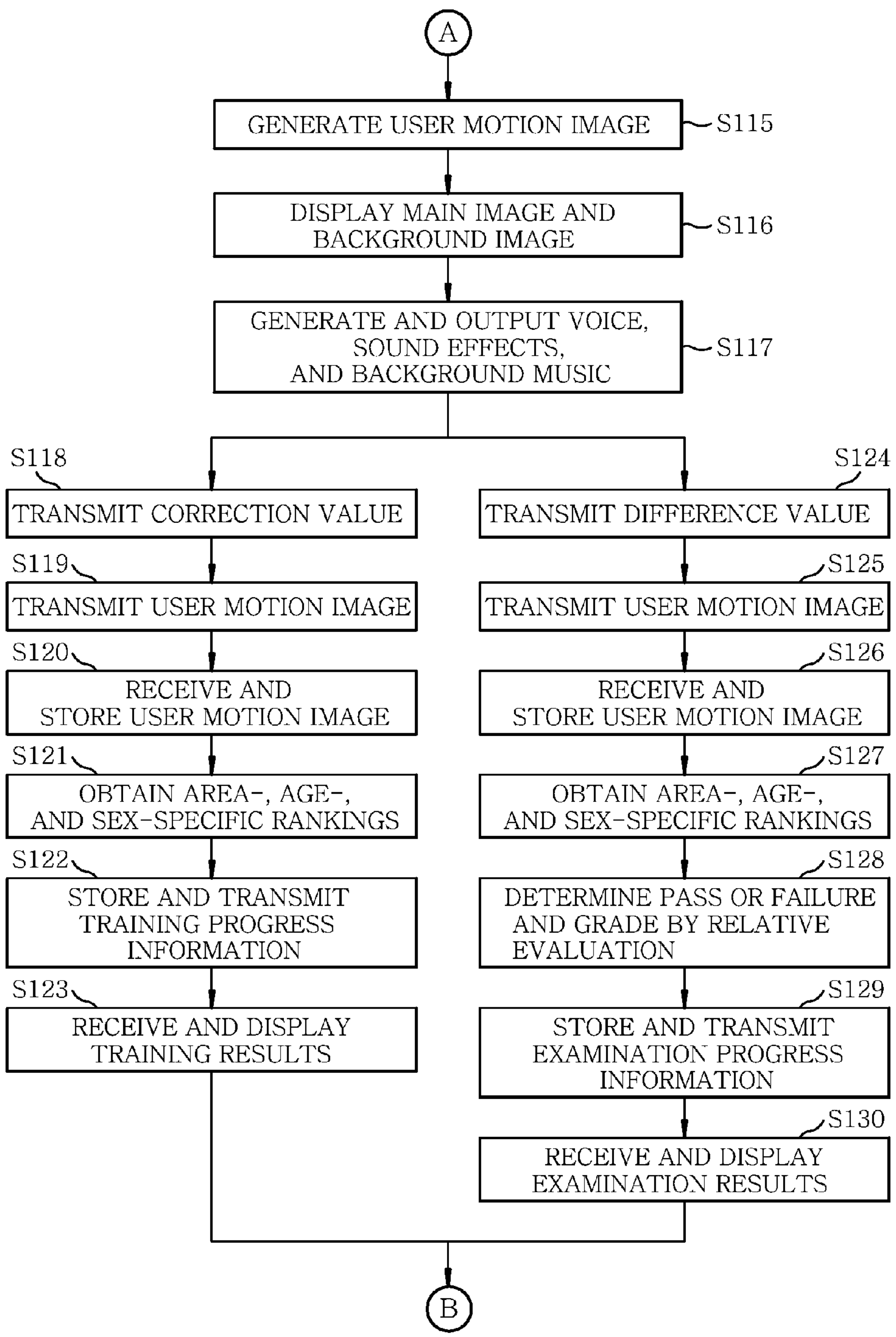
Figure 11C:
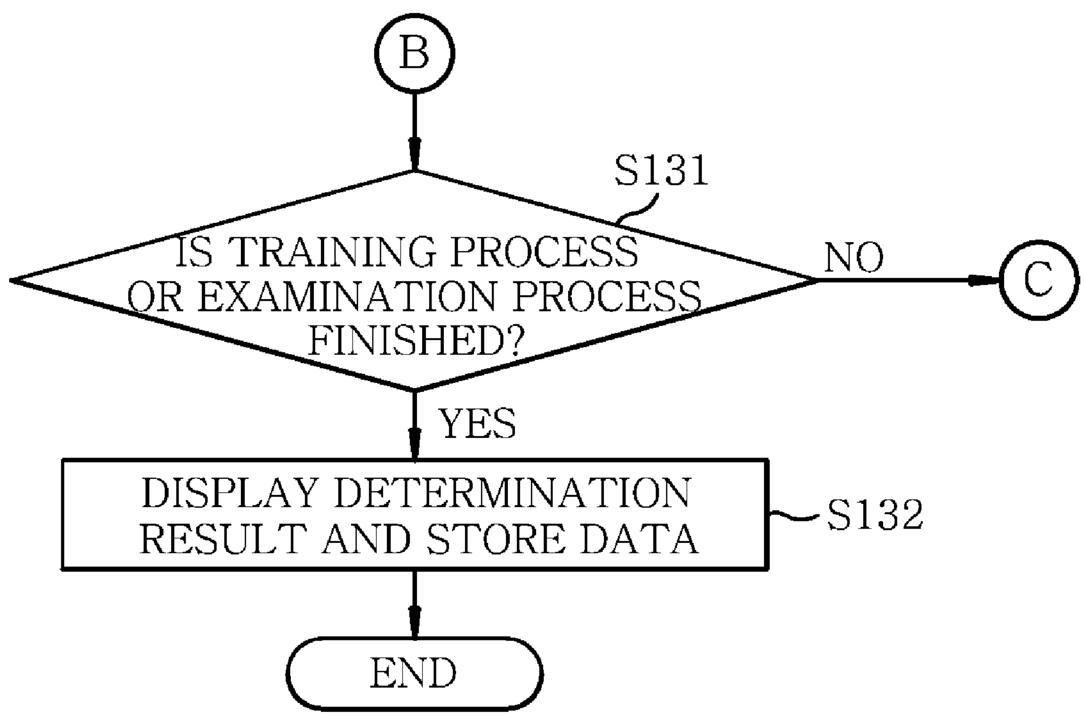

FIGS. 11A to 11C are flowcharts illustrating a method of virtually training in martial arts using a network according to embodiments of the present invention. Operation of embodiments of the present invention constituted as described above will be described with reference to the appended drawings.

First, the user information management means 21 of the network server 20 accessing the Internet 40 receives user information transmitted from the user terminal 50, compares the user information with information previously stored in the user information DB 31, and allows a user to log in (S101 to 5103)

At this time, using the login key 110 of the input unit 100 of the user terminal 50, the user inputs the user information with numerals, characters, etc., thereby logging in to the network server 20. Alternatively, the user may log in using an integrated circuit (IC) card or electronic chip to which the user information has been input.

When logging in has completed, one training process to be performed may be selected from among a plurality of previously stored grade-specific training processes using the training process selection key 120 (S104). On the other hand, one examination process to be performed may be selected from among a plurality of previously stored grade-specific examination processes using the examination process selection key 130 (S104).

When a training process is selected, the user terminal 50 transmits a selected training discipline and grade to the network server 20, the training information management means 22 reads training progress information according to the training discipline and grade from the training information DB 32 and transmits the training progress information to the user terminal 50, and the user terminal 50 executes a training program according to the training progress information (S105 to S107).

On the other hand, when an examination process is selected, the user terminal 50 transmits a selected examination discipline and grade to the network server 20, the examination information management means 23 reads examination progress information according to the examination discipline and grade from the examination information DB 33 and transmits the examination progress information to the user terminal 50, and the user terminal 50 executes an examination program according to the examination progress information (S108 to S110).

When the training or examination program is executed, the motion recognition unit 200 of the user terminal 50 detects a movement speed, a distance, a position, and an angle of the user, thereby recognizing a user motion (S111).

Also, the position detector 300 detects a position of the user's feet on a plane, and the controller 400 determines an accurate user motion in 3D space with reference to the user motion recognized by the motion recognition unit 200 and the position of the user's feet detected by the position detector 300 (S112 and S113).

Also, the comparison and determination module 430 of the controller 400 of the user terminal 50 compares the user motion with a reference motion previously stored in the data storage unit 500, thereby generating a difference value and a correction value (S114).

The image generation module 450 generates a user motion image using a previously stored virtual character, and also generates a correction image and an explanatory phrase for the correction value (S115).

Also, the main image display unit 600 merges the correction image and the explanatory phrase with the user motion image generated by the image generation module 450 and displays the merged image, and the sound output unit 800 outputs sound generated by the sound generation module 460 (S116 and S117).

Recognizing the user motion (S111) may include attaching a plurality of markers to the user's body and detecting movement of the markers using infrared photography and using the plurality of motion capture cameras 210 to recognize the user motion.

Also, recognizing the user motion (S111) may include sensing a direction of terrestrial magnetism using the geomagnetic sensor 220 attached to the user's body or clothing, accelerating a piezoelectric material and sensing an acceleration using the acceleration sensor 230, or sensing an angular acceleration based on a vertical force of a rotating angle using the gyro sensor 240, to recognize the user motion.

Displaying the main image (S116) includes further generating, at the image generation module 450 of the controller 400, an effect image and a background image, and displaying, at the background image display unit 700, the effect image and the background image on a screen.

Displaying the main image (S116) includes displaying a 3D image viewed through 3D glasses worn by the user on the screen using the 3D image display module 610, displaying successive 3D images by generating interference fringe patterns based on the principle of holography using the hologram image display module 620, or displaying a realized image on an HMD screen of the HDM module 630 put on the user's head.

Outputting the sound (S117) includes generating, at the sound generation module 460 of the controller 400, a voice explanation corresponding to the correction value and sound effects and background music according to the voice explanation, and outputting, at the sound output unit 800, the voice explanation, the sound effects, and the background music through the plurality of speakers 810.

The detailed constitution of the user terminal 50 operating in this way has been described above with reference to FIGS. 2 to 10, and will not be reiterated.

After this, the user terminal 50 executing the training program transmits the correction value and the user motion image to the network server 20, and the image information management means 25 of the network server 20 receives and stores the user motion image in the image information DB 35 (S118 to S120).

Also, the training information management means 22 obtains area-, age-, and sex-specific training rankings according to the correction value, updates the training information DB 32 with the training progress information, and transmits the training progress information to the user terminal 50, and the user terminal 50 receives and displays the training result on the screen (S121 to S123).

On the other hand, the user terminal 50 executing the examination program transmits the difference value of the user motion and the user motion image to the network server 20, and the image information management means 25 receives and stores the user motion image in the image information DB 35 (S124 to S126).

Also, the training information management means 23 obtains area-, age-, and sex-specific examination rankings based on the difference value, and determines the pass or failure based on the difference value transmitted from the examination and determination management means 24 (S127 and S128). At this time, the examination and determination management means 24 determines a pass or a failure and a grade by relative evaluation within the corresponding category according to the area-, age-, and sex-specific rankings.

The area in which the user terminal 50 is located may be checked based on an IP of the user allocated by an ISP.

After this, the examination information DB 33 is updated with the examination progress information, the examination progress information is transmitted to the user terminal 50, and the user terminal 50 receives and displays the examination results on the screen (S129 and S130).

In embodiments of the present invention configured as described above, many difference values of a motion, such as an angle of an upper body, an angle of a knee, the rotatability of a body and a portion of a foot used, based on a body type, height, weight or the like of the user can be detected depending on the accuracy of detection. Also, a standard motion of a model who is the most similar to the trainee may be set as a reference by classifying respective persons according to body type, height, weight, etc., so that a difference value can be calculated.

For example, a motion of a cyber master may be shown in advance on a video screen. Although a front kick can be performed while a body is moving back, force can be accurately applied by moving the weight forward in order to attack a front counterpart.

While making a preparatory posture, the cyber master outputs a voice instructing the user to kick the cyber master him or herself. Various words may be output depending on the circumstances. As an example, the voice "You must come forward to kick me. I'm ready. Kick me while coming forward. Here!" may be output.

The cyber master may explain the evaluation of a motion and strength of a kick as follows: "Very good. Attack my face this time. Here!", "Your knee was too low for that attack. Pull your knee up a bit more before you kick. Face kick again. Here!," and "Excellent attack."

In the case of a correct attack, the cyber master in the screen may be knocked down, etc. to show a reaction to the strength. Alternatively, a color effect may be used for a correct attack. For example, blue light may be displayed.

When such a training process or examination process has completed, the user terminal 50 accessing the network server 20 logs out, and the system is finished (S131 and S132).

In the above-described system and method for virtual martial arts training using a network according to embodiments of the present invention, each of a plurality of terminals senses each motion of a user, compares the motion with a reference motion, displays the results as images, and exchanges the images with a server via the network. Thus, real-time information exchange and interaction is enabled between a trainee and the server in a house, a gym, or an academy without temporal and spatial constraints, and the trainee alone can effectively train in martial arts by having his or her motions corrected and can effectively undertake an examination procedure.

In addition to the field of martial arts, embodiments of the present invention can be applied to various fields in which it is possible to learn standardized motions, for example, dance, gymnastics, and sports.

While the embodiments of the present invention and their advantages have been described in detail, it should be understood that various changes, substitutions and alterations may be made herein without departing from the scope of the invention.

What is claimed is:

1. A system for virtual martial arts training using a network, comprising:

a user terminal configured to access an Internet to exchange user information with a network server, select a training discipline and grade or an examination discipline and grade to receive training progress information according to the selected training discipline and grade or examination progress information according to the selected examination discipline and grade and to execute a training program or an examination program, and transmit a difference value between a user motion and a reference motion and a correction value together with a user motion image to perform training and examination functions;

a network server configured to comprise user information management means configured to receive the user information from the user terminal, and compare the user information with previously stored information to allow a user to log in, training information management means configured to transmit the training progress information according to the training discipline and grade transmitted from the user terminal, receive the training results, perform updates using the training results, and manage the training results, examination information management means configured to transmit the examination progress information according to the examination discipline and grade transmitted from the user terminal, receive the examination results, perform updates using the examination results, and manage the examination results, examination and determination management means configured to compare the difference value between the user motion and the reference motion transmitted from the user terminal with a passing standard value to determine pass or failure of an examination, image information management means configured to receive the user motion image transmitted from the user terminal, perform updates using the user motion image, and manage the user motion image, and communication means configured to exchange information with the user terminal;

data management means configured to comprise a user information database (DB) for storing the user information, a training information DB for storing the training progress information, an examination information DB for storing the examination progress information, an examination and determination DB for storing examination and determination information, and an image information DB for storing the user motion image, and configured to input and output the respective pieces of information in response to a request from the network server; and a network administrator terminal configured to access the network server to exchange network administrator information and manage the system;

wherein the user terminal includes:

an input unit configured to receive the user information to allow the user to log in, and select a grade-specific training process or examination process;

a motion recognition unit configured to detect a movement speed, a distance, a position, and an angle of the user to recognize the user motion;

a position detector configured to detect a position of the user's feet on a plane; a data storage unit configured to previously store a movement speed, a distance, a position, and an angle of the reference motion, and store the user information, the determination result, and a grade-specific training process program and examination process program corresponding to the selection of the input unit;

a controller configured to execute the training process program or the examination process program stored in the data storage unit according to the selection of the input unit, determine a user motion in three-dimensional (3D) space with reference to the user motion recognized by the motion recognition unit and the position of the user's feet detected by the position detector, compare parameters of the user motion comprising the movement speed, the distance, the position and the angle of the user motion with corresponding parameters of the reference motion previously stored in the data storage unit to calculate the difference value, generate the correction value for instructing the user to perform a correct motion based on the difference value, generate the user motion image using a previously stored virtual character, and generate a correction image and an explanatory phrase for the correction value;

a main image display unit configured to merge the correction image and the explanatory phrase with the user motion image generated by the controller and display the merged image; and a communication unit configured to exchange the user information, the training progress information, the examination progress information, and the user motion image with the communication means of the network server to transfer the pieces of information and the user motion image to the controller.

2. The system of claim 1, wherein the training information management means and the examination information management means obtain area-, age-, and sex-specific rankings based on the difference value between the user motion and the reference motion and the correction value transmitted from the user terminal, and update the respective pieces of training and examination progress information, and the examination and determination management means determines a pass or a failure and a grade within a corresponding category according to the area-, age-, and sex-specific rankings by comparing the difference value between the user motion and the reference motion transmitted from the user terminal with the passing standard value.

3. The system of claim 2, wherein an area in which the user terminal is located is checked based on an Internet protocol (IP) address of the user allocated by an Internet service provider (ISP).

4. The system of claim 1, wherein the input unit includes:

a login key configured to receive the user information and allow the user to log in;

a training process selection key configured to select one training process to be performed from among a plurality of previously stored grade-specific training processes; and an examination process selection key configured to select one examination process to be performed from among a plurality of previously stored grade-specific examination processes.

5. The system of claim 4, wherein the controller comprises:

a program execution module configured to execute the training process program or the examination process program stored in the data storage unit according to the selection of the training process selection key or the examination process selection key;

a motion determination module configured to determine the user motion in 3D space with reference to the user motion recognized by the motion recognition unit and the position of the user's feet detected by the position detector;

a comparison and determination module configured to calculate the difference value by comparing data of the user motion determined by the motion determination module with the data of the reference motion previously stored in the data storage unit, and generate the correction value for instructing the user to perform the correct motion based on the difference value; and an image generation module configured to generate the user motion image using the previously stored virtual character, generate the correction image using the difference value and the correction value of the comparison and determination module, and generate the explanatory phrase.

6. The system of claim 5, wherein the image generation module further generates an effect image and a background image according to the user motion image of the main image display unit, and comprises a background image display unit configured to display the effect image and the background image on a flat panel display (FPD) module.

7. The system of claim 6, wherein the controller further comprises:

a sound generation module configured to generate sound effects and background music according to the main image, the effect image, and the background image generated by the image generation module; and a sound output unit configured to output the sound effects and the background music generated by the sound generation module through a speaker.

8. The system of claim 1, wherein the motion recognition unit comprises a plurality of motion capture cameras configured to detect movement of a plurality of markers attached to the user's body using infrared photography to recognize the user motion.

9. The system of claim 1, wherein the motion recognition unit comprises one or a combination of a geomagnetic sensor configured to sense a direction of terrestrial magnetism, an acceleration sensor configured to sense an acceleration by accelerating a piezoelectric material, and a gyro sensor configured to sense an angular acceleration based on a vertical force of a rotating angle, the one or the combination of the sensors being attached to the user's body or clothing.

10. The system of claim 1, wherein the position detector comprises a resistive touchpad configured to have a predetermined area and measure the position of coordinates pressed by the user's feet and formed of two panels stacked to generate a resistance at a pressed portion.

11. The system of claim 1, wherein the main image display unit comprises:

3D glasses worn by the user; and a 3D image display module configured to display a 3D image, to be viewed in three dimensions through the 3D glasses, on a screen.

12. The system of claim 1, wherein the main image display unit comprises a hologram image display module configured to display successive 3D images by generating interference fringe patterns using a principle of holography.

13. The system of claim 1, wherein the main image display unit comprises a head mounted display (HMD) module put on the user's head, and configured to display a realized image on an HMD screen.

14. The system of claim 1, further comprising a user image capturing unit configured to capture an image of the user, wherein the controller generates the user motion image using the image captured by the user image capturing unit.

15. A method of virtually training in martial arts using a network, comprising:

receiving, at user information management means of a network server accessing the Internet, user information from a user terminal, and comparing the user information with information previously stored in a user information database (DB) to allow a user to log in;

selecting and transmitting, at the user terminal, a training discipline and grade, reading, at training information management means, training progress information according to the training discipline and grade from a training information DB and transmitting the training progress information to the user terminal, and executing, at the user terminal, a training program according to the training progress information;

selecting and transmitting, at the user terminal, an examination discipline and grade, reading, at examination information management means, examination progress information according to the examination discipline and grade from an examination information DB and transmitting the examination progress information to the user terminal, and executing, at the user terminal, an examination program according to the examination progress information;

detecting, at a motion recognition unit of the user terminal, a movement speed, a distance, a position, and an angle of the user to recognize a user motion, detecting, at a position detector, a position of the user's feet on a plane, and determining, at a controller, a user motion in three-dimensional (3D) space with reference to the user motion recognized by the motion recognition unit and the position of the user's feet detected by the position detector;

comparing, at the controller of the user terminal, the user motion with a reference motion previously stored in a data storage unit to generate a difference value according to parameters comprising the movement speed, the distance, the position and the angle of the user motion and a correction value, generating a user motion image using a previously stored virtual character, generating a correction image and an explanatory phrase for the correction value, merging the correction image and the explanatory phrase with the user motion image to display the merged image on a main image display unit, and outputting sound;

transmitting, at the user terminal, the correction value and the user motion image, receiving and storing, at image information management means, the user motion image in an image information DB, obtaining, at the training information management means, area-, age-, and sex-specific training rankings according to the correction value, updating the training information DB with the training progress information, and transmitting the training progress information to the user terminal, and receiving and displaying, at the user terminal, the training results on a screen; and transmitting, at the user terminal, the difference value between the user motion and the reference motion and the user motion image, receiving and storing, at the image information management means, the user motion image in the image information DB, obtaining, at the examination information management means, area-, age-, and sex-specific examination rankings based on the difference value between the user motion and the reference motion, determining, at examination and determination management means, pass or failure and a grade within a corresponding category according to the area-, age-, and sex-specific examination rankings by comparing the difference value with a passing standard value, updating the examination information DB with the examination progress information, and transmitting the examination progress information to the user terminal, and receiving and displaying, at the user terminal, the examination results on the screen.

16. The method of claim 15, wherein an area in which the user terminal is located is checked based on an Internet protocol (IP) address of the user allocated by an Internet service provider (ISP).

17. The method of claim 15, wherein the recognizing the user motion comprises attaching a plurality of markers to the user's body and detecting movement of the markers using infrared photography and using a plurality of motion capture cameras to recognize the user motion.

18. The method of claim 15, wherein the recognizing the user motion comprises sensing a direction of terrestrial magnetism using a geomagnetic sensor attached to the user's body or clothing, accelerating a piezoelectric material and sensing an acceleration using an acceleration sensor, or sensing an angular acceleration based on a vertical force of a rotating angle using a gyro sensor, to recognize the user motion.

19. The method of claim 15, wherein the displaying the merged image comprises further generating, at the controller, an effect image and a background image, and displaying, at a background image display unit, the effect image and the background image on the screen.

20. The method of claim 15, wherein the outputting the sound comprises generating, at the controller, a voice explanation corresponding to the correction value and sound effects and background music according to the voice explanation, and outputting, at a sound output unit, the voice explanation, the sound effects and the background music via a speaker.

21. The method of claim 15, wherein the displaying the merged image comprises displaying a 3D image to be viewed through 3D glasses worn by the user on the screen using a 3D image display module, displaying successive 3D images by generating interference fringe patterns based on a principle of holography using a hologram image display module, or displaying a realized image on a head mounted display (HMD) screen of an HMD module put on the user's head.

* * * * *